(12) United States Patent
Murao et al.

(10) Patent No.: US 6,753,102 B2
(45) Date of Patent: Jun. 22, 2004

(54) MAGNETIC RECORDING MEDIUM AND MAGNETIC RECORDING APPARATUS

(75) Inventors: Reiko Murao, Higashine (JP); Chiaki Okuyama, Kawasaki (JP); Akira Kikuchi, Higashine (JP)

(73) Assignee: Fujitsu Limited, Kawasaki (JP)

(*) Notice: Subject to any disclaimer, the term of this patent is extended or adjusted under 35 U.S.C. 154(b) by 75 days.

(21) Appl. No.: 10/107,724

(22) Filed: Mar. 27, 2002

(65) Prior Publication Data

US 2003/0124388 A1 Jul. 3, 2003

(30) Foreign Application Priority Data

Dec. 27, 2001 (JP) .................................. 2001-397024

(51) Int. Cl.⁷ .............................................. G11B 5/66
(52) U.S. Cl. .................. 428/694 TZ; 428/694 TM; 428/694 BS; 428/694 R
(58) Field of Search ............... 428/694 TZ, 694 TM, 428/694 BS, 694 R, 692, 694 TP, 694 TC, 644 MN, 694 TS (56) References Cited

U.S. PATENT DOCUMENTS

2001/0010870 A1 * 8/2001 Song et al. ............... 428/694

2002/0037441 A1 * 3/2002 Okuyama et al. .......... 428/694

FOREIGN PATENT DOCUMENTS

| JP | 06-104113 | * 4/1994 | .......... H01F/10/12 |
| JP | 08-329458 | 12/1996 | |
| JP | 11-175945 | 7/1999 | |
| JP | 2001-67636 | 3/2001 | |

* cited by examiner

*Primary Examiner*—Deborah Jones
*Assistant Examiner*—Vivek Koppikar
(74) *Attorney, Agent, or Firm*—Greer, Burns & Crain, Ltd.

(57) ABSTRACT

An object of this invention is to provide a magnetic recording medium in which its S/Nm (output/medium noise ratio) is improved. This magnetic recording medium is comprised of a first foundation layer made of alloy material composed of mainly Cr with added B, a second foundation layer made of alloy material in which Mo is mixed in Cr, an intermediate layer made of alloy material composed of mainly Co with added Cr and Ta, a lower magnetic layer and an upper magnetic layer made of alloy material composed of mainly Co with added Cr, Pt, B and a protective film composed of mainly C, these layers being formed in this order from the bottom.

7 Claims, 12 Drawing Sheets

Fig. 12

MAGNETIC RECORDING MEDIUM AND MAGNETIC RECORDING APPARATUS

BACKGROUND OF THE INVENTION

1. Field of the Invention

The present invention relates to a magnetic recording medium in which information is recorded with the direction of its magnetization and a magnetic recording apparatus for recording information in the magnetic recording medium.

2. Description of the Related Art

A magnetic recording apparatus represented by a magnetic disc drive has been well known and this magnetic recording apparatus is used as an outside recording apparatus of a computer or the like.

With development of information processing technology in recent years, demand for a magnetic recording apparatus and a magnetic recording medium having a higher recording density has been increasing. One of characteristics required for the magnetic recording medium, which satisfies such a demand is that the S/Nm (ratio between output and medium noise) is high. Various kinds of technologies have been proposed to realize this characteristic.

One of technical aims to raise the S/Nm is to improve resolution of a recording/reproducing signal and the resolution of the recording/reproducing signal is improved more as the pulse width Pw50 of a recording/reproducing waveform decreases. It is well known that the pulse width Pw50 of the recording/reproducing waveform has a relation of:

$$a \propto (t \times Mr/Hc)$$
$$Pw50 = \sqrt{\{2(a+d)^2 + (a/2)^2\}}$$

where coercive force, which is magnetostatic characteristic of the magnetic recording medium, is Hc, remnant magnetization is Mr and magnetic film thickness is t. d indicates magnetic spacing.

From the above-described relation, it is considered effective to reduce the magnetic layer thickness t and increase coercive force Hc in order to improve resolution of the recording/reproducing signal. However, if the magnetic layer thickness t is reduced more than a certain level, the coercive force Hc drops, so that the resolution of the recording/reproducing signal is decreased conversely. Although technology of adding Pt to the magnetic layer of CoCr alloy has been generally adopted in order to increase the coercive force Hc, no sufficiently high resolution or S/Nm has been obtained.

Another technical object for intensifying the S/Nm is to reduce noise in medium. This noise in medium is reduced by equalizing magnetic particles in the magnetic layer by minimizing them, and by weakening magnetic reaction between magnetic particles.

As technology for weakening magnetic reaction between magnetic particles, technology of increasing composition ratio of Cr in magnetic layer of CoCr alloy has been proposed. As technology for minimizing the magnetic particle, technology of adding Ta, Nb, B, P and the like to the magnetic layer of CoCr alloy has been proposed. However, currently, noise in medium has not been reduced sufficiently.

Further, as technology for equalizing the magnetic particles while minimizing, technology of thinning a foundation layer, which is a foundation of the magnetic layer, has been also proposed. However, if the foundation layer is thinned, crystal orientation of the foundation layer is worsened and accompanied thereby, in-plane orientation of the magnetic layer is also worsened thereby leading to increase of noise in medium.

Although various kinds of technologies have been proposed, no sufficiently high S/Nm has been achieved yet with only those conventional technologies, and therefore, it is demanded to raise the S/Nm further.

SUMMARY OF THE INVENTION

Accordingly, in views of the above-described problems, an object of the present invention is to provide a magnetic recording medium and a magnetic recording apparatus capable of improving the S/Nm.

To achieve the above object, according to an aspect of the present invention, there is provided a magnetic recording medium comprising:

a base body composed of nonmagnetic metallic material;

a first foundation layer made of alloy material which is formed on the base body and composed of mainly Cr with added B;

a second foundation layer made of alloy material which is composed of one or more layers formed on the first foundation layer and in which one or more elements selected from a group consisting of Mo, Ta, Ti, W and V are mixed in Cr; and a magnetic layer made of alloy material which is formed on the second foundation layer and composed of mainly Co.

In the magnetic recording medium of the present invention, the first foundation layer improves crystal orientation and the second foundation layer interconnects between the first foundation layer and the magnetic layer each having a different gap between the atoms. Therefore, the S/Nm is improved further.

Preferably, when a combination of composition B expressed by atomic % and thickness is expressed by a coordinate point (composition B, layer thickness), the first foundation layer has composition ratio and thickness expressed as a coordinate point within a region surrounded by lines gained by connecting a coordinate point (2 at %, 3 nm), a coordinate point (2.5 at % 3 nm), a coordinate point (4 at %, 7 nm), a coordinate point (4 at %, 9 nm), a coordinate point (3.5 at %, 13 nm), a coordinate point (2 at %, 14 nm), a coordinate point (0.5 at %, 13 nm), a coordinate point (0.5 at %, 6 nm), a coordinate point (1 at %, 4 nm) and a coordinate point (2 at %, 3 nm) successively. If the magnetic recording medium of the present invention has such atomic % and thickness, a sufficiently high S/Nm can be achieved.

Preferably, the first foundation layer contains B of 1% or more to 2.5% or less in terms of composition ratio expressed in atom quantity ratio and a thickness of 6 nm or more to 13 nm or less.

If the magnetic recording medium of the present invention has such composition ratio and thickness, not only a sufficiently high S/Nm can be achieved, but also stability of the characteristic for manufacturing error is ensured.

Preferably, the second foundation layer is made of alloy material having body-centered cubic lattice structure in which one or more elements selected from Mo, Ta, Ti, W and V are mixed in Cr at 1% or more in terms of composition ratio expressed in atom quantity ratio.

The second foundation layer having such composition and lattice structure can interconnect the first foundation layer and the magnetic layer effectively.

Preferably, the second foundation layer is comprised of plural layers and total sum of composition ratios of other elements than Cr is smaller in a layer nearer the first foundation layer, in the plural layers of the second foundation layer.

The second foundation layer comprised of plural layers can interconnect the first foundation layer and the magnetic layer effectively.

Preferably, the magnetic layer is comprised of plural layers and a magnetic layer located at the lowest level of the plural magnetic layers is an intermediate layer having a thickness of 1 nm or more to 5 nm or less and coercive force of $2,000/(4\pi)$ (kA/m) or less.

Because such an intermediate layer is possessed, the magnetic recording medium of the present invention can improve its S/Nm ratio further.

Preferably, the magnetic recording medium of the present invention further comprises a protective layer which is formed on said magnetic layer and composed of mainly C.

Because such a protective layer is possessed, in the magnetic recording medium of the present invention, its magnetic layer can be protected and a high S/Nm can be maintained for a long term.

To achieve the above-described object, according to another aspect of the present invention, there is provided a magnetic recording apparatus containing a magnetic recording medium for recording information with the direction of magnetization and a magnetic head disposed adjacent or in contact with the magnetic recording medium for indicating the magnitude of resistance depending on the direction of magnetization at each point on the magnetic recording medium so as to reproduce information by detecting the direction of magnetization at each point on the magnetic recording medium by detecting the magnitude of resistance of the magnetic head, wherein the magnetic recording medium comprises:

a base body composed of nonmagnetic metallic material;
  a first foundation layer made of alloy material which is formed on the base body and composed of mainly Cr with added B;
  a second foundation layer made of alloy material which is composed of one or more layers formed on the first foundation layer and in which one or more elements selected from a group consisting of Mo, Ta, Ti, W and V are mixed in Cr; and
  a magnetic layer made of alloy material which is formed on the second foundation layer and composed of mainly Co.

The magnetic recording apparatus of the present invention comprises the magnetic head utilizing so-called magnetic resistance effect and the magnetic recording medium having the above-described structure so as to reproduce information at a high S/Nm.

Although only the basic configuration of the magnetic recording apparatus of the present invention is indicated in this specification, this intends to just avoid duplication and the magnetic recording apparatus of the present invention includes not only the magnetic recording apparatus of such basic configuration but also various types of the magnetic recording apparatuses corresponding to each configuration of the above-described magnetic recording medium.

DESCRIPTION OF THE PREFERRED EMBODIMENTS

Hereinafter, the preferred embodiments of the present invention will be described with reference to the accompanying drawings.

Figure 1:
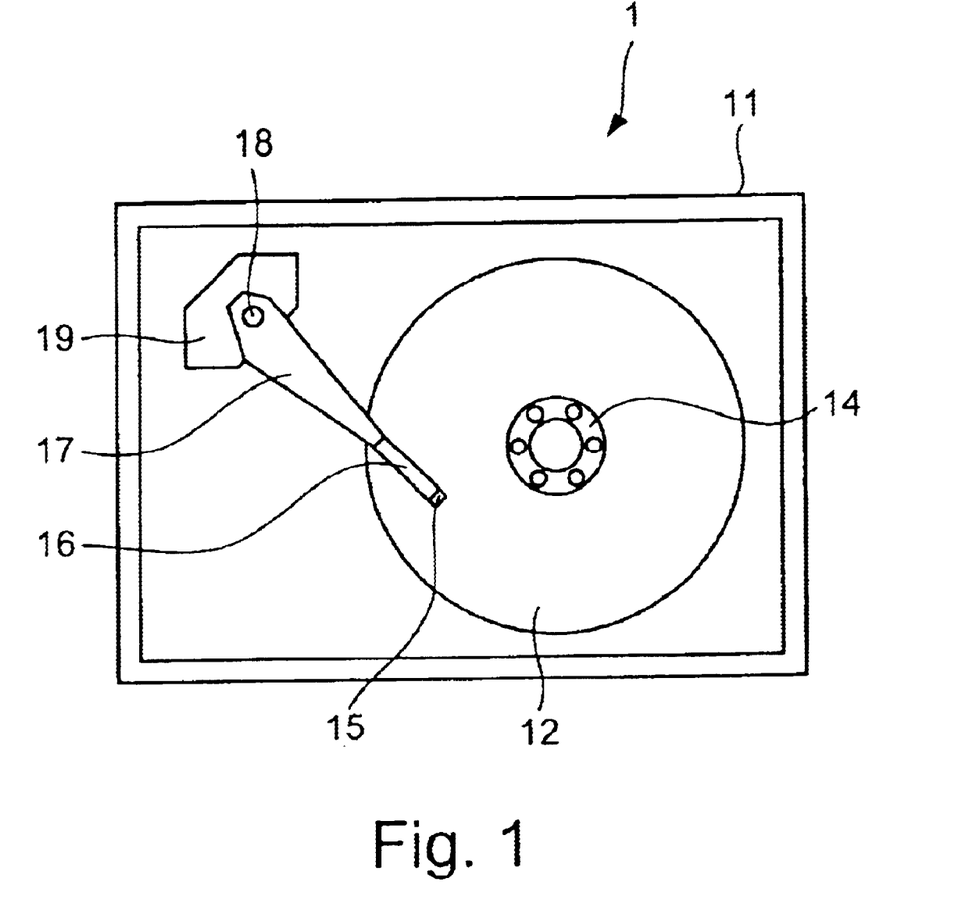
FIG. 1 is a front view showing a hard disc drive (HDD) of a magnetic recording apparatus according to an embodiment of the present invention.
Figure 2:
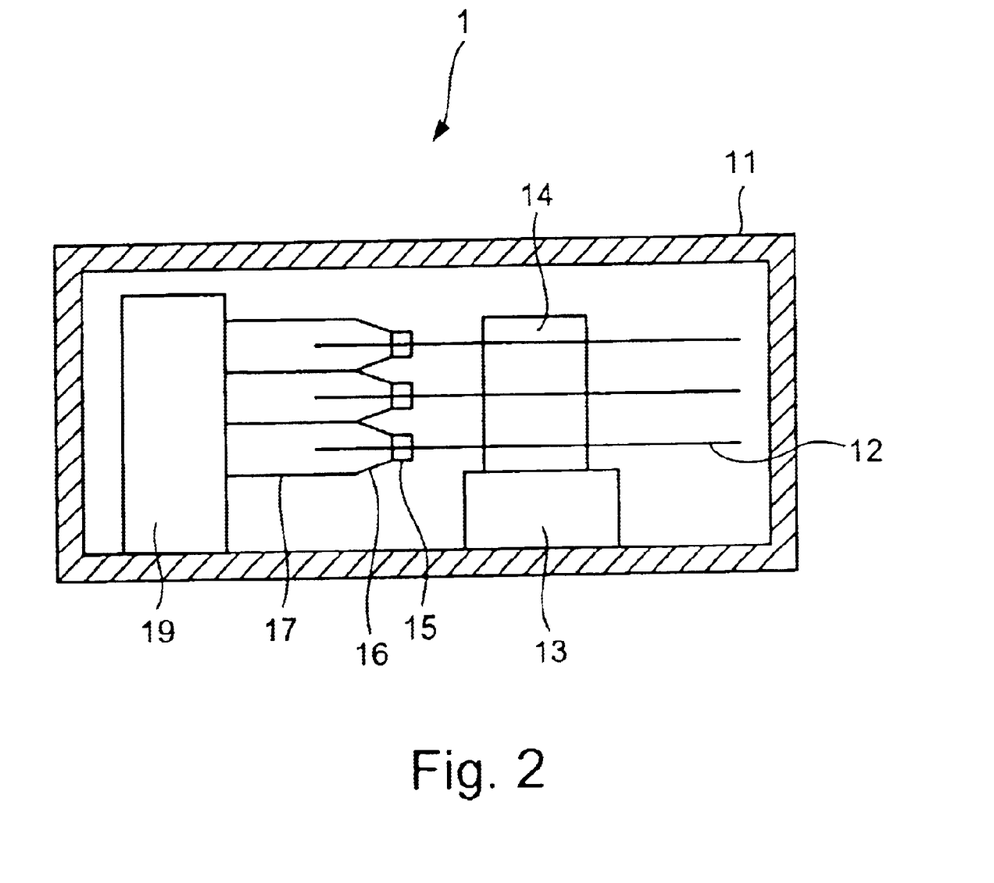
FIG. 2 is a side sectional view showing a hard disc drive (HDD) of the magnetic recording apparatus according to an embodiment of the present invention.

FIG. 1 is a front view showing a hard disc drive (HDD) of a magnetic recording apparatus according to an embodiment of the present invention and FIG. 2 is a side sectional view showing the hard disc drive (HDD).

The hard disc drive (HDD) 1 shown in the same Figure incorporates plural magnetic discs 12 within its housing 11. The magnetic disc 12 corresponds to an example of the magnetic recording medium of the present invention. Although the quantity of the magnetic discs can be considered to be 1, 2, 4 and the like, an example in which three magnetic discs are provided is indicated here. These magnetic discs 12 are mounted on a hub 14 rotated by a drive motor 13 and rotated with the hub 14.

Six floating head sliders 15 each located in the vicinity of the surface of the magnetic disc 12 such that it opposes, six carriage arms 17 on which the floating head sliders 15 are fixed through each suspension 16 and an actuator 19 for driving those six carriage arms 17 around an arm shaft 18 are accommodated within the housing 11 of this HDD 1.

The aforementioned floating head slider 15 includes a composite type recording/reproducing head comprised of a magnetic resistance effect type reproducing head represented by so-called magnetic resistance (MR) head or giant magnetic resistance (GMR) head and a recording head represented by so-called inductive head.

This HDD 1 records information into the magnetic disc 12 and reproduces information recorded in the magnetic disc 12. Upon the recording or reproduction of information, first, the carriage arm 17 is driven by the actuator 19 composed of a magnetic circuit so that the floating head slider 15 is located on a desired track on the rotating magnetic disc 12. The aforementioned magnetic head is provided at a front end of the floating head slider 15 and this magnetic head approaches each one bit region arranged in each track of the magnetic disc 12 successively when the magnetic disc 12 is rotated. Upon recording of information, electric recording signals are inputted to the magnetic head adjacent the magnetic head 12 in this way. This magnetic head applies magnetic field to each one bit region corresponding to the inputted recording signal so as to record information carried by the recording signal as the direction of magnetization in each one bit region. Upon reproduction of information, the magnetic head fetches out information recorded as the direction of magnetization in each one bit region by generating an electric reproduction signal corresponding to magnetic field generated from each magnetization.

The aforementioned magnetic disc 12 has the layer structure in which various kinds of layers are overlaid. A feature of the magnetic recording apparatus of the present invention in this HDD 1 is the layer structure of the magnetic disc 12. Hereinafter, the layer structure of the magnetic disc 12 will be described.

Figure 3:
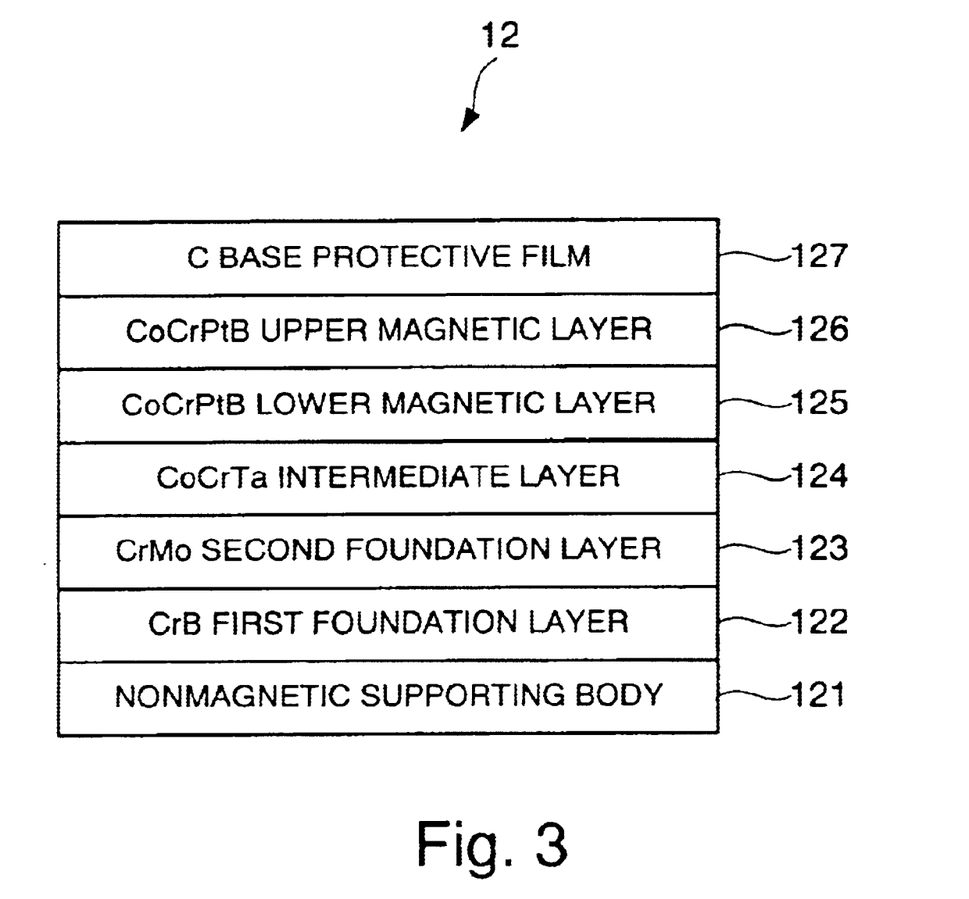
FIG. 3 is a conceptual diagram showing the layer structure of the magnetic disc.

FIG. 3 is a conceptual diagram showing the layer structure of the magnetic disc. The layer structure shown in FIG. 3 is an example of the layer structure in the magnetic recording medium of the present invention and the magnetic recording medium of the present invention is not restricted to the layer structure shown in FIG. 3.

According to the layer structure shown in FIG. 3, the magnetic disc 12 is comprised of nonmagnetic supporting body 121 composed of Al coated with NiP film by electroless deposition, that is, whose surface is subjected to texture treatment, a first foundation layer 122 made of alloy material composed of mainly Cr with added B and a second foundation layer 123 made of alloy material in which Mo is mixed in Cr. In a following description, the first foundation layer 122 and the second foundation layer 123 will be called a foundation layer as a whole in some cases.

The magnetic disc 12 is further comprised of an intermediate layer 124 made of alloy material composed of mainly Co with added Cr and Ta, a lower magnetic layer 125 and an upper magnetic layer 126, each made of alloy material composed of mainly Co with added Cr, Pt and B and a protective layer 127 composed of mainly C. The intermediate layer 124, the lower magnetic layer 125 and the upper magnetic layer 126 are an example of the magnetic layer mentioned in the present invention and these layers will be called magnetic layer as a whole in some cases.

According to the layer structure shown in FIG. 3, the second foundation layer 123 is 2 nm thick, the intermediate layer 124 is 1 nm thick, the lower magnetic layer 125 and the upper magnetic layer 126 are totally 6 nm thick and the protective film 127 is 5 nm thick.

The texture treatment to be executed on the nonmagnetic supporting body 121 is treatment for forming fine grooves in the circumferential direction of the magnetic disc 12. If this treatment is executed, orientation ratio (O.R.)(Hc in the circumferential direction/Hc in the diameter direction) in the lower magnetic layer 125 and the upper magnetic layer 126 is improved thereby contributing to improvement of S/Nm.

The alloy material which is used for the first foundation layer 122 and composed of mainly Cr has an excellent crystal orientation. Further, by adding B to the first foundation layer 122, the S/Nm is improved as described in detail later.

The alloy material used for the second foundation layer 123 in which Mo is mixed in Cr relaxes mismatch between the crystal lattice of the first foundation layer 122 and the crystal lattice of the lower magnetic layer 125 and the upper magnetic layer 126 according to a principle described later. Consequently, the in-plane orientation (Hc in the in-plane direction/Hc in depth direction) in the magnetic layer is improved thereby improving the S/Nm.

As described above, existence of the intermediate layer 124 improves the S/Nm further. Further, existence of the protective film 127 secures durability (wear resistance) and corrosion resistance and maintains a high S/Nm for a long term.

Figure 4:
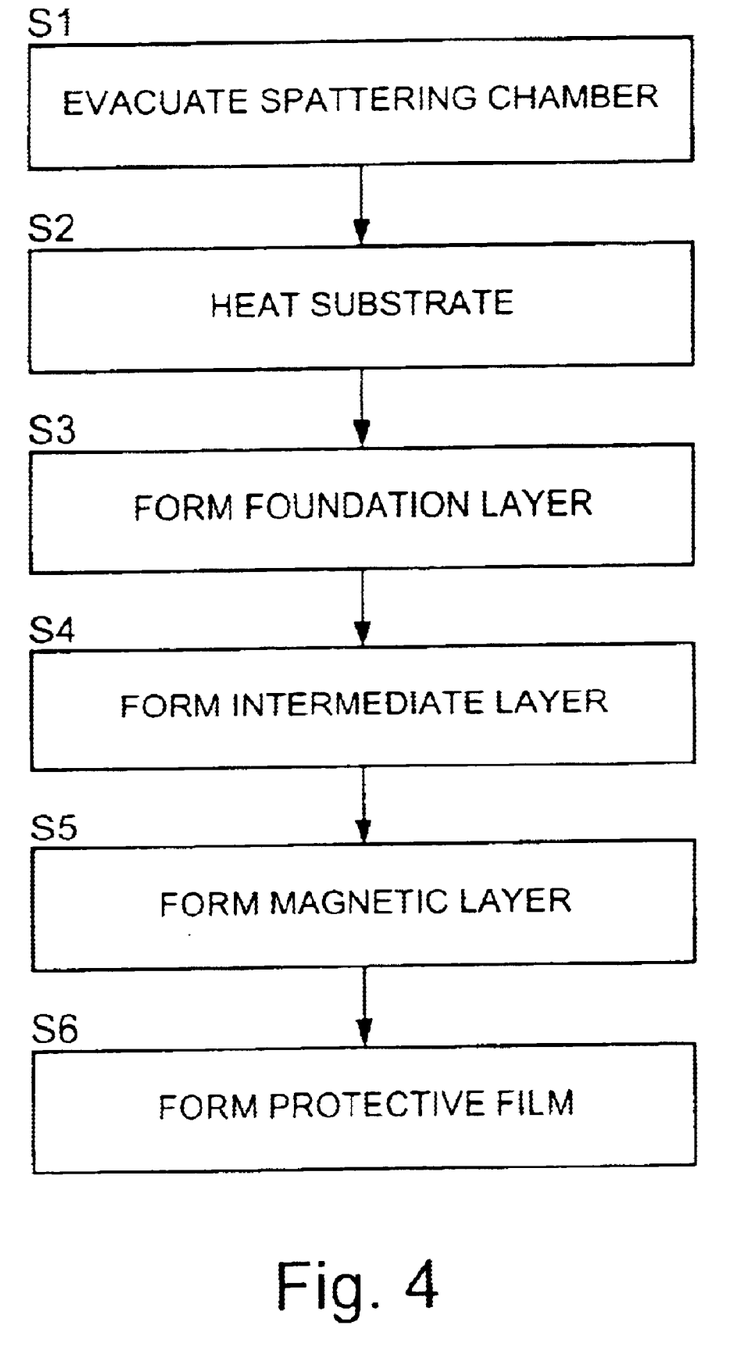
FIG. 4 is a diagram showing an example of a procedure for creating the layer structure shown in FIG. 3.

FIG. 4 is a diagram showing an example of a procedure for creating the layer structure shown in FIG. 3.

First, a nonmagnetic supporting body (substrate) coated with NiP film by electroless deposition is placed in a spattering chamber and the spattering chamber is evacuated down to $4 \times 10^{-5}$ Pa or less (step S1). Next, the substrate is heated until the substrate temperature reaches 220° C. (step S2). Although the substrate temperature in substrate heating process of this step S2 may be other temperature than 220° C., it is desired to be in a range of 160–300° C. in order to obtain a high S/Nm. If the substrate temperature is 160° C. or more, effects of cleaning the substrate surface and controlling crystal orientation of the lower foundation layer can be obtained. If the substrate temperature is 300° C. or more, growth of crystal grain becomes remarkable thereby worsening smoothness of the medium surface, which is not favorable. If the electroless deposition NiP film is used as described above, it is desirable to suppress the heating temperature down to 270° C. or lower in order to suppress crystallization of NiP under high temperatures. Meanwhile, execution timing of the substrate heating process is not restricted to the time before formation of the lower foundation layer but may be carried out before formation of the magnetic layer for example. Further, the substrate heating process may be executed plural times.

According to the procedure shown in FIG. 4, after the aforementioned step S2, Ar gas is introduced into the spattering chamber so as to maintain 0.67 Pa and the lower foundation layer is formed in this environment (step S3). Then, the intermediate layer is formed (step S4), the magnetic layer is formed (step S5) and finally, the protective film is formed (step S6).

The thickness and composition ratio of the layer structure formed in such a procedure will be described in detail below.

First, the thickness and composition ratio of the first foundation layer will be described.

Figure 5:
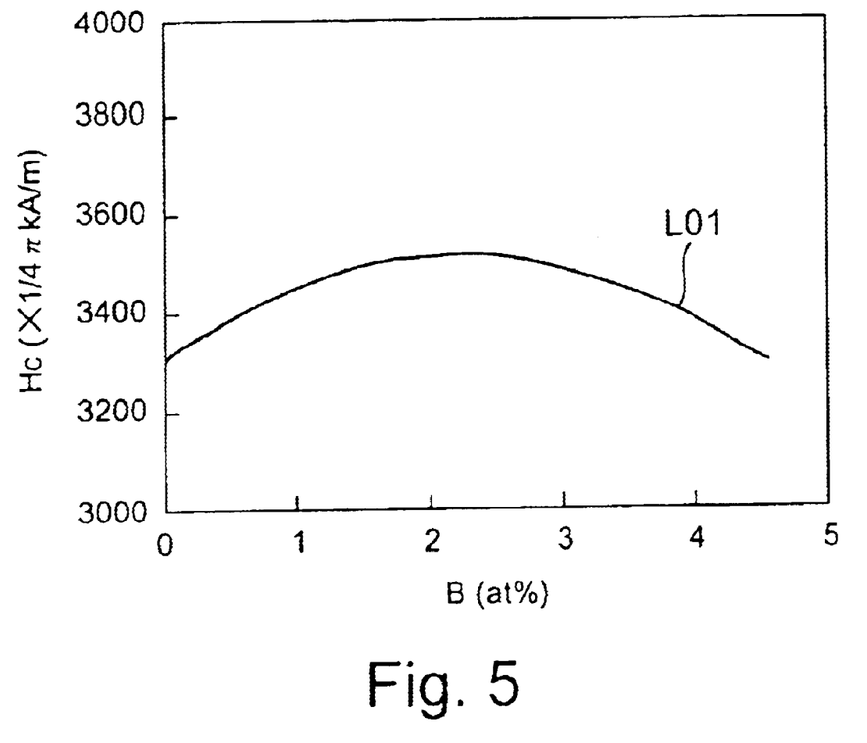
FIG. 5 is a graph showing the relation between composition ratio of B added to alloy material of the first foundation layer and coercive force in the magnetic recording medium.
Figure 6:
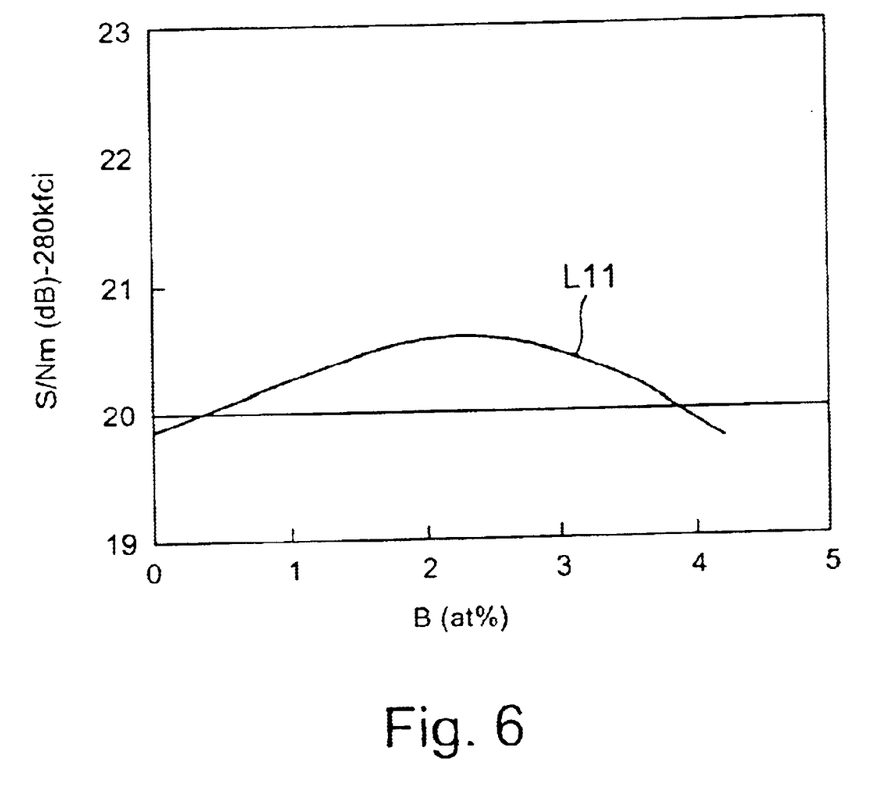
FIG. 6 is a first graph showing the relation between composition ratio of B added to alloy material of the first foundation layer and S/Nm of the magnetic recording medium.
Figure 7:
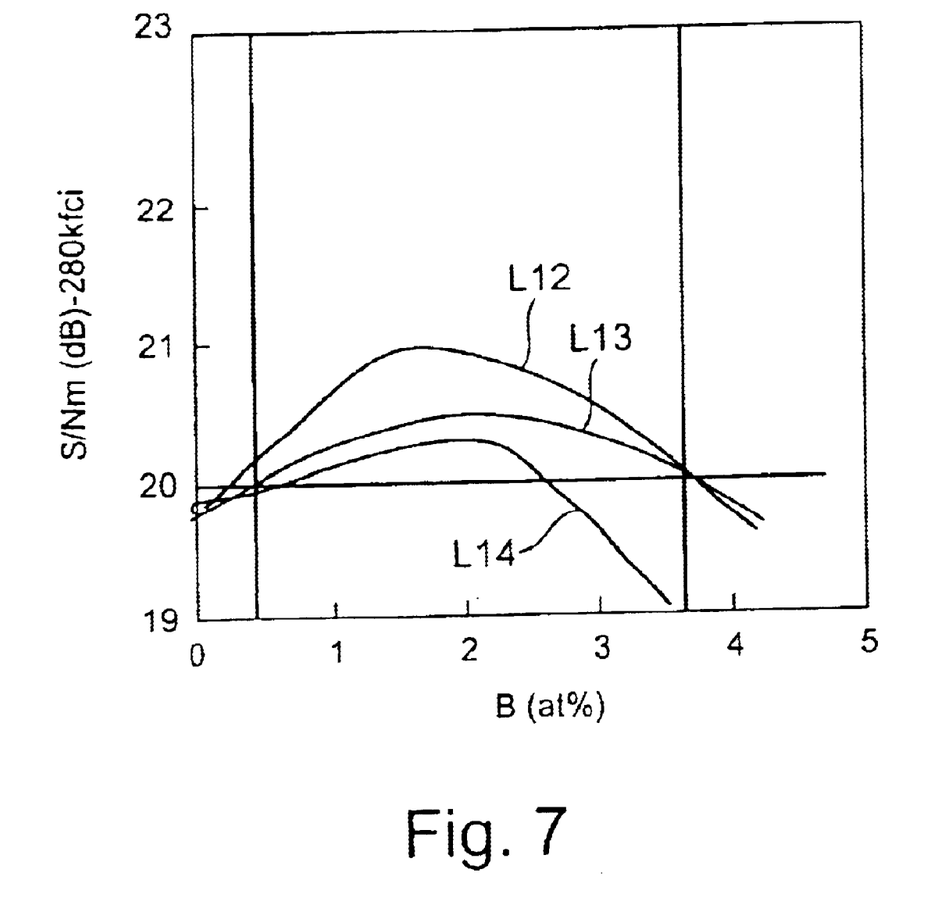
FIG. 7 is a second graph showing the relation between composition ratio of B added to alloy material of the first foundation layer and S/Nm of the magnetic recording medium.
Figure 8:
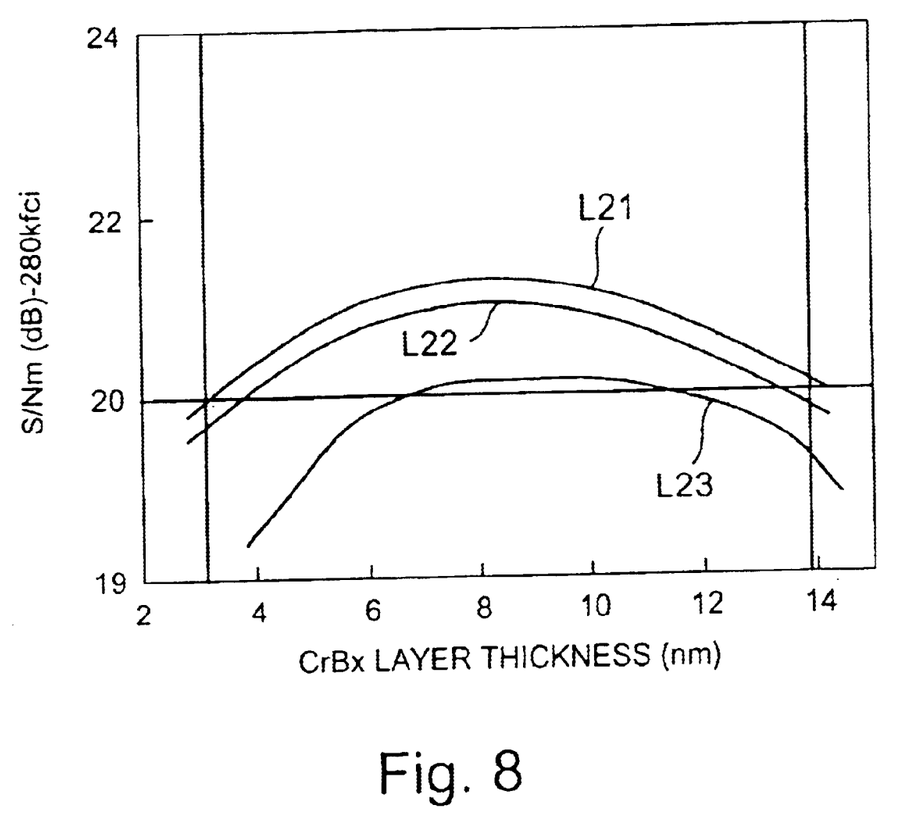
FIG. 8 is a graph showing the relation between thickness of the first foundation layer and S/Nm of the magnetic recording medium.

FIG. 5 is a graph showing the relation between composition ratio of B to be added to alloy material for the first foundation layer and coercive force in the magnetic recording medium. FIGS. 6 and 7 are graphs indicating the relation between the composition ratio of B to be added to alloy material for the first foundation layer and S/Nm in the magnetic recording medium. FIG. 8 is a graph indicating the relation between the thickness of the first foundation layer and S/Nm in the magnetic recording medium. Hereinafter, the thickness and composition ratio of the first foundation layer will be described with reference to these Figures.

In FIG. 5, the abscissa axis indicates the composition ratio of B to be added to alloy material of the first foundation layer with atom quantity ratio (at %) while the ordinate axis indicates coercive force Hc in the magnetic recording medium. This graph indicates an upward projected curve L01 and this curve L01 indicates the relation between the composition ratio of B and the coercive force Hc. This curve L01 is maximized when the composition ratio of B is about 2 at %.

It is preferable that the coercive force Hc of the magnetic recording medium is higher in order to improve resolution for a reproduction signal. According to the curve L01 in the graph shown in FIG. 5, if B is added to the first foundation layer, the coercive force increases more than that of pure Cr when the composition ratio of B is about 4 at % or less and the coercive force Hc reaches its maximum when the composition ratio of B is about 2 at %.

In FIGS. 6 and 7, the abscissa axis indicates composition ratio of B to be added to alloy material of the first foundation layer with atom quantity ratio (at %) and the ordinate axis indicates S/Nm in the magnetic recording medium. This S/Nm indicates S/Nm when recording in a magnetic recording medium with magnetization inverted at linear density of 280 flux change per inch (kfci).

FIGS. 6 and 7 show four upward projected curves L11, L12, L13 and L14 and these curves indicate the relation between composition ratio of B and S/Nm. The curve L11 in FIG. 6 indicates the relation between composition ratio of B and S/Nm when the thickness of the first foundation layer is 10 nm. The three curves L12, L13 and L14 in FIG. 7 indicate the relation between composition ratio of B and S/Nm when the thickness is 6 nm, 13 nm, 3 nm.

The curve L11 in FIG. 6 indicates that if the thickness of the first foundation layer is 10 nm, the S/Nm exceeds a desired S/Nm which is 20 dB when the composition ratio of B is about 0.5 to about 3.8 at %.

Further, the three curves in FIG. 7 indicate that if the thickness of the first foundation layer is 6 nm, 13 nm, 3 nm, the S/Nm exceeds 20 dB when the composition ratio of B is about 0.2 to about 3.7 at %, about 0.4 to about 3.6 at %, about 0.5 to about 2.6 at %.

In a graph of FIG. 8, its abscissa axis indicates thickness of the first foundation layer and its ordinate axis indicates S/Nm (linear density: 280 kfci) in the magnetic recording medium.

FIG. 8 indicates three upward projected curves L21, L22 and L23 and these curves L21, L22 and L23 indicate the relation between the thickness and S/Nm when the composition ratio of B is 2 at %, 1 at % and 4 at %. These curves L21, L22 and L23 indicate that if the composition ratio of B is 2 at %, 1 at % and 4 at %, the S/Nm exceeds 20 dB when the thickness of the first foundation layer is about 3 to about 14 nm, about 3.5 to about 13.5 nm, about 6.5 to about 11.1 nm.

It is possible to obtain preferable ranges of the thickness of the first foundation layer and the composition ratio of B based on the relation between the composition ratio of B and the S/Nm shown in FIGS. 6 to 8.

Figure 9:
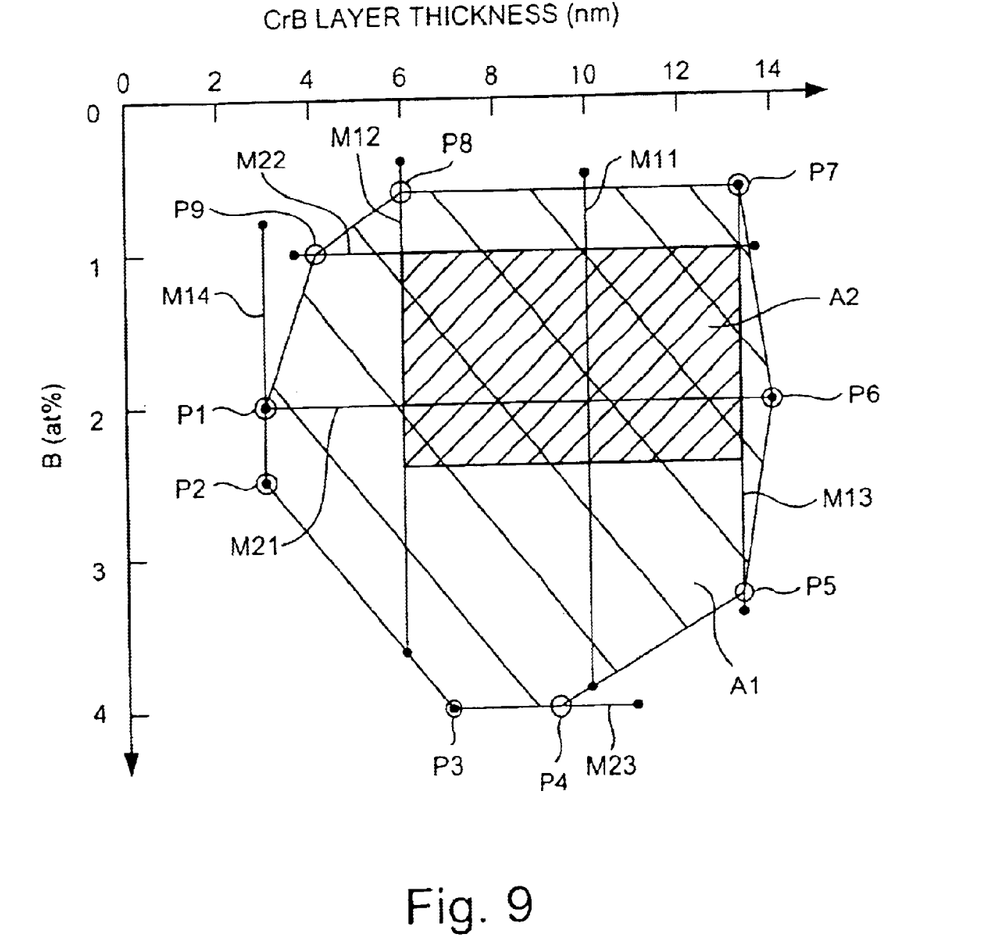
FIG. 9 is a graph showing a preferable range of the thickness and the composition ratio of B in the first foundation layer.

FIG. 9 is a graph showing preferable ranges of the thickness of the first foundation layer and composition ratio of B.

In the graph of FIG. 9, its abscissa axis indicates the thickness of the first foundation layer and its ordinate axis indicates composition ratio of B.

The graph of FIG. 9 indicates seven lines M11, M12, M13, M14, M21, M22 and M23 each whose both ends are expressed with black dots. These lines M11, M12, M13, M14, M21, M22 and M23 correspond to curves L11, . . . , L14, L21, . . . , L23 shown in FIGS. 6 to 8, indicating each range in which the S/Nm exceeds 20 dB. If the ranges indicated with these lines M11, . . . , M14, M21, . . . , M23 are integrated, a region A1 surrounded with lines produced by successively connecting nine coordinate points P1, P2, P3, P4, P5, P6, P7, P8 and P9 each indicated with a white dot is obtained as a region in which the S/Nm exceeds 20 dB. Here, each coordinate point P1, . . . P9 indicates (2%, 3 nm), (2.5%, 3 nm), (4%, 7 nm), (4%, 9 nm), (3.5%, 13 nm), (2%, 14 nm), (0.5%, 13 nm), (0.5%, 6 nm) and (1%, 4 nm). This region A1 indicates preferable ranges of the thickness of the first foundation layer and the composition ratio of B.

Further, if a range in which changes in the S/Nm are small with respect to manufacturing error in thickness and composition ratio generated when producing a recording medium is considered, a rectangular region A2 shown in FIG. 9 is obtained. This region indicates a range in which the composition ratio of B is 1% or more to 2.5% or less and the thickness is 6 nm or more to 13 nm or less.

Next, an effect of existence of plural foundation layers (two foundation layers exist in this embodiment) will be described.

Figure 10:
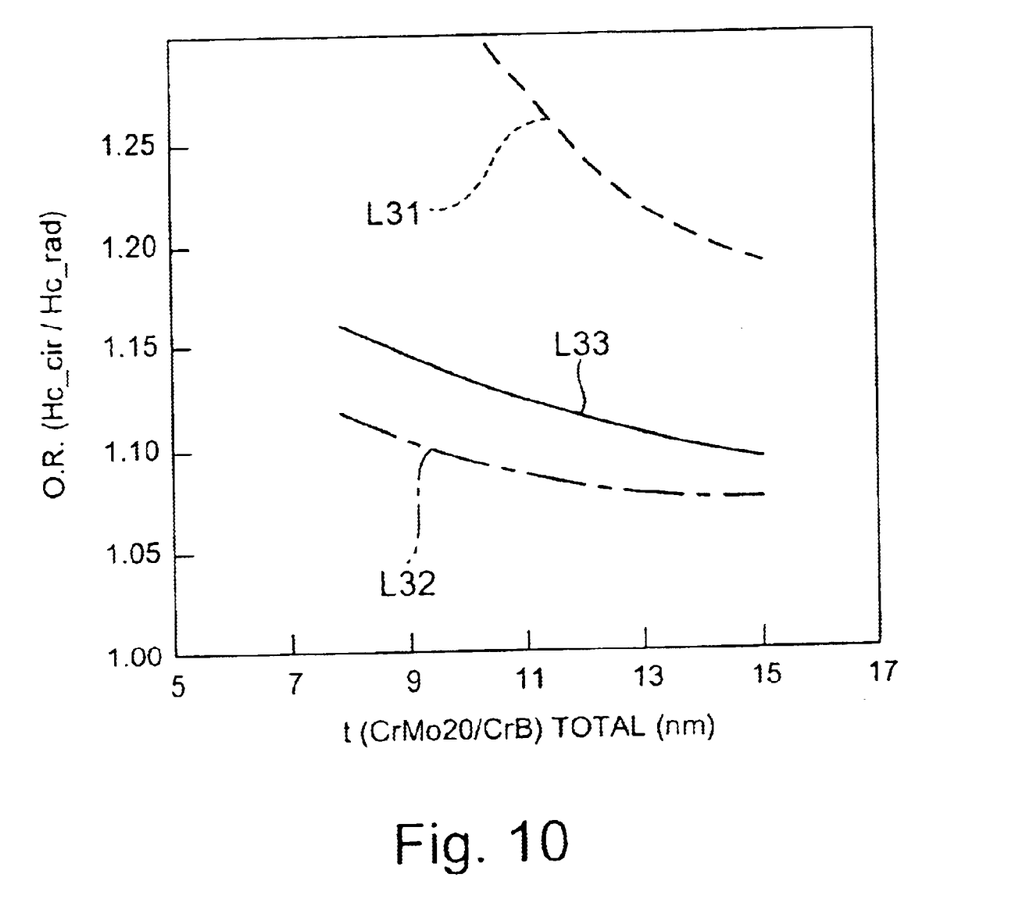
FIG. 10 is a graph for explaining an effect of foundation layer's being composed of plural layers.

FIG. 10 is a graph for explaining an effect of foundation layer's being constituted of plural layers.

In the graph of FIG. 10, its abscissa axis indicates the thickness of the foundation layer and its ordinate axis indicates the aforementioned O.R. (Hc in the circumferential direction/Hc in the diameter direction) in the magnetic recording medium. This graph indicates three rightward rising curves L31, L32 and L33 and the curve L33 of a solid line indicates the relation between total thickness of plural foundation layers and O.R. of this embodiment. Here, as comparative examples, a first comparative example having a single foundation layer made of alloy material composed of mainly Cr with added B like the alloy material composing the first foundation layer and a second comparative example having a single foundation layer made of alloy material in which Mo is mixed in Cr at 20 at % like the alloy material composing the second foundation layer are employed. The curve L31 of dotted line and the curve L32 of dot and dash line indicate the relation between the thickness of the foundation layer and O.R. in each of the first comparative example and second comparative example.

If comparing the curve L33 with the curve L32, it is evident that this embodiment has a higher O.R. than the second comparative example. Further, if comparing the curve L33 with the curve L31, it is also evident that the first comparative example has a higher O.R. than the present embodiment.

Although if attention is paid to only the O.R., it comes that the first comparative example ensures the most excellent performance, if attention is paid to the in-plane orientation (Hc in in-plane direction/Hc in depth direction) of the magnetic layer, it is known that the first comparative example is worse than the second comparative example. Additionally, it has been experimentally recognized that the in-plane orientation of this embodiment is similar to the second comparative example.

That is, because the foundation layer is composed of plural layers according to this embodiment, it is possible to produce a medium in which the in-plane orientation is high and the O.R. is improved.

It can be considered that the O.R. is generated because distortion of crystal lattice differs between the circumferential direction and the diameter direction. Actually, the CrB has a larger lattice distortion in the circumference and diameter directions as compared to CrMo or the like and it can be considered that the single layer of CrB gains a high O.R. as shown in FIG. 10. According to the present invention, the foundation layer composed of plural layers is adopted to allow both the high O.R. obtained when CrB is formed and high in-plane orientation when CrMo is formed to coexist.

Next, the composition of the second foundation layer will be considered.

Because the crystal lattice of the first foundation layer 122 is similar to the crystal lattice of pure Cr, the first foundation layer 122 has a small lattice gap. On the other hand, because the lower magnetic layer 125 and the upper magnetic layer 126 contain Pt with high composition ratio such that its composition ratio (at %) expressed with atom quantity ratio is 6 at % or more to 20 at % or less, the lattice gap is large in the lower magnetic layer 125 and the upper lattice layer 126. The second foundation layer 123 aims at relaxing mismatch which is originated from a difference in the lattice gap. If a foundation layer in which B is added to CrMo alloy is assumed, the crystallity of the foundation layer is worsened and then the in-plane orientation of the magnetic layer is worsened, thereby the S/Nm being no improved. The intermediate layer 124 exists between the second foundation layer 123 and the lower magnetic layer 125 and this intermediate layer 124 has a crystal lattice having a high matching with the crystal lattice of the lower magnetic layer 125 and therefore, if the crystal lattice is considered, it may be considered that the intermediate layer 124 accompanies the lower magnetic layer 125.

Although alloy material in which Mo is mixed in Cr is employed in the second foundation layer 123 of this embodiment, it is permissible to employ alloy material in which one or more elements selected from Ta, Ti, W and V having characteristic which expands the crystal lattice in Cr alloy material are mixed in Cr in order to relax mismatch originated from a difference in the aforementioned gap of crystal lattice. These elements can be considered to have an effect of expanding the gap of the crystal lattice if it is contained at 1 at % or more. Further, it is considered that the crystal structure of alloy material needs to be BCC structure in order to obtain an effect of relaxing mismatch of the gap in the lattice by expanding the gap in the lattice. According to a phase diagram of binary alloy (bulk), Mo, Ti, W, V are soluble in Cr fully and has BCC structure in a range of 0 to 100 at % in terms of addition amount. Further, Ta has the BCC structure when the addition amount is 4 at % or less.

Next, the thickness and composition of the intermediate layer will be described.

Figure 11:
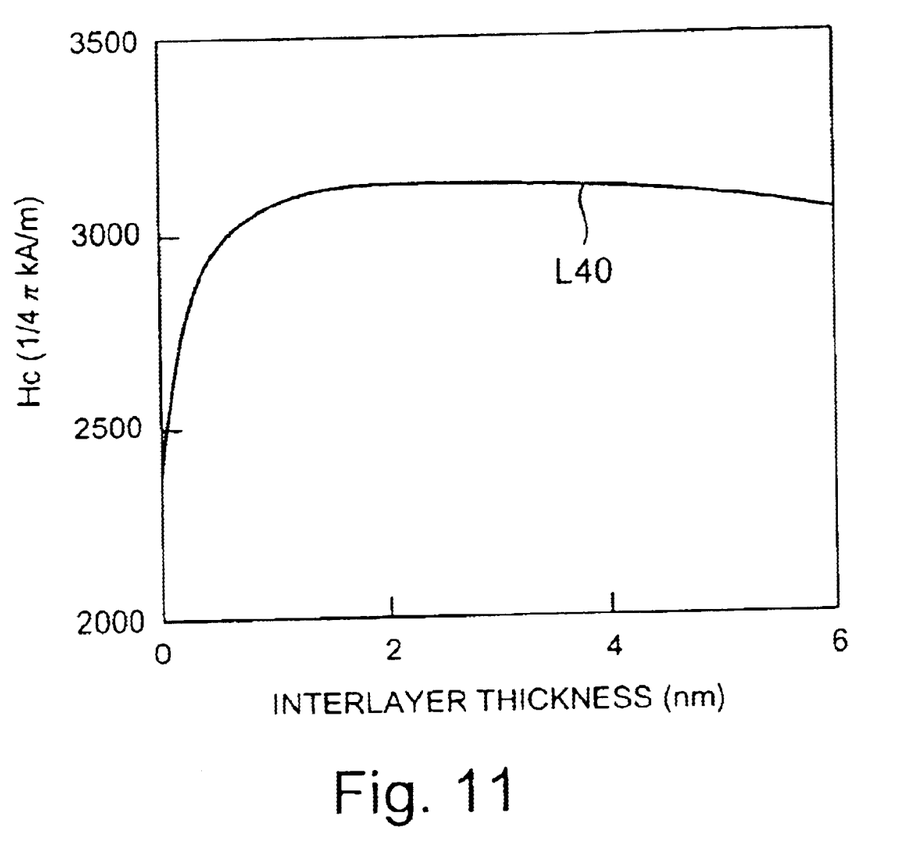
FIG. 11 is a graph showing the relation between the thickness of an intermediate layer and coercive force of the magnetic recording medium.

FIG. 11 is a graph showing the relation between the thickness of the intermediate layer and the coercive force of the magnetic recording medium.

In FIG. 11, its abscissa axis indicates the thickness of the intermediate layer and its ordinate axis indicates coercive force of the magnetic recording medium. The curve L40 in the graph indicates layer thickness dependency of coercive force indicating that the coercive force is increased largely if the intermediate layer of 1 nm or more is formed. This can be considered to be attained because the in-plane orientation of the magnetic layer is improved by existence of the intermediate layer formed with Co base alloy having a higher in-plane orientation than the magnetic layer.

Figure 12:
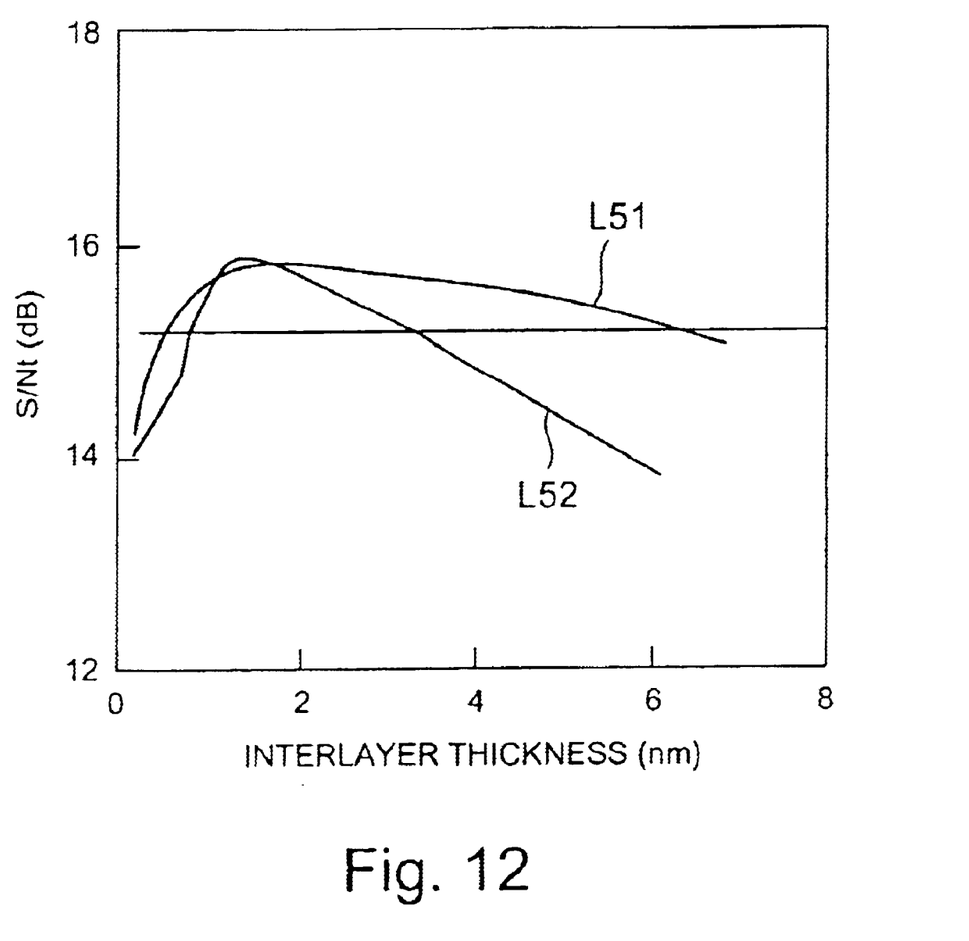
FIG. 12 is a graph showing the relation between the thickness of the intermediate layer and output/total noise ratio (S/Nt).

FIG. 12 is a graph indicating the relation between the thickness of the intermediate layer and output/total noise ratio (S/Nt).

In FIG. 12, its abscissa axis indicates the thickness of the intermediate layer and its ordinate axis indicates the output/total noise ratio (S/Nt) in recording density of 280 kFCI. The same graph shows two curves L51, L52 and these curves L51, L52 indicate layer thickness dependency of the output/total noise ratio (S/Nt).

The upper curve L51 indicates the relation between the thickness of the CoCr intermediate layer and output/total noise ratio (S/Nt), indicating that an S/Nt equal to or higher than a desired 15 dB can be obtained in a range of the thickness of 1 nm to 5 nm. Further, the lower curve L52 indicates the relation between the thickness of the CoCrTa intermediate layer and output/total noise ratio (S/Nt) of this embodiment, indicating that an S/Nt of a desired 15 dB or higher can be obtained in the range of the thickness of 1 nm to 3 nm. The CoCr intermediate layer corresponds to an example of the intermediate layer mentioned in the present invention.

Table 1 below shows composition of alloy material suitable for the intermediate layer of the present invention and coercive force at the same time. Additionally, this Table indicates tBs for reference.

TABLE 1

| Composition | tBs (nTm) | Hc (1/4πA/m) |
| --- | --- | --- |
| CoC15rPt6 | 13.2 | 1781 |
| CoCr25Pt6 | 5.7 | 1390 |
| CoCr15Pt8 | 10.7 | 1964 |
| CoCr25Pt10 | 5.4 | 1685 |
| CoCr12Ta2 | 11.6 | 1494 |
| CoCr23Ta2 | 6.8 | 1207 |
| CoCr8Ta5 | 13.4 | 1558 |
| CoCr13Ta5 | 8.9 | 1936 |
| CoCr25 | 5.4 | 429 |
| CoCr30 | 3.6 | 406 |

If an intermediate layer is formed of alloy material having a composition indicated in Table 1, an S/Nt equal to or higher than a desired 15 dB can be obtained in the range of the thickness of at least 1 nm to 3 nm. Although the intermediate layer composed of alloy material of any composition is included in the magnetic layer from the viewpoint that it possesses magnetism, its coercive force is not sufficient as a magnetic layer for recording information because it is less than $2,000/(4\pi)(kA/m)$.

Although this embodiment indicates that the second foundation layer is of single layer as an example, the second foundation layer of the present invention may be of plural layers. Such second foundation layer composed of plural layers is so desired that total sum of composition ratios of elements other than Cr is smaller in a layer nearer the first foundation layer. As described above, other elements than Cr contained in the alloy material composing the second foundation layer takes a role for expanding the gap of the crystal lattice. The composition ratio of other elements than Cr in the second foundation layer is smaller in a layer nearer the first foundation layer in which the composition ratio of Cr is high and the gap of the lattice is small. The second foundation layer near the magnetic layer having a wide lattice gap has a higher composition ratio in other elements than Cr. Thus, the second foundation layer interconnects the first foundation layer and the magnetic layer effectively.

What is claimed is:

1. A magnetic recording medium comprising:
    a base body composed of nonmagnetic metallic material;
    a first foundation layer made of alloy material which is formed on said base body and composed of mainly Cr with added B;
    a second foundation layer made of alloy material which is composed of one or more layers formed on said first foundation layer and in which one or more elements selected from a group consisting of Mo, Ta, Ti, W and V are mixed in Cr; and
    a magnetic layer made of alloy material which is formed on said second foundation layer and composed of mainly Co wherein said second foundation layer is comprised of plural layers and the total sum, in atomic %, of elements other than Cr is smaller in the layer nearer said first foundation layer.

2. A magnetic recording medium according to claim 1, wherein when a combination of composition B expressed by atomic % and thickness is expressed by a coordinate point (composition B, layer thickness), said first foundation layer has composition ratio and thickness expressed as a coordinate point within a region surrounded by lines gained by connecting a coordinate point (2 at %, 3 nm), a coordinate point (2.5 at %, 3 nm), a coordinate point (4 at %, 7 nm), a coordinate point (4 at %, 9 nm), a coordinate point (3.5 at %, 13 nm), a coordinate point (2 at %, 14 nm), a coordinate point (0.5 at %, 13 nm), a coordinate point (0.5 at %, 6 nm), a coordinate point (1 at %, 4 nm) and a coordinate point (2 at %, 3 nm) successively.

3. A magnetic recording medium according to claim 1, wherein said first foundation layer contains B of 1% or more to 2.5% or less in terms of composition ratio expressed in atom quantity ratio and a thickness of 6 nm or more to 13 nm or less.

4. A magnetic recording medium according to claim 1, wherein said second foundation layer is made of alloy material having body-centered cubic lattice structure in which one or more elements selected from a group consisting of Mo, Ta, Ti, W and V are mixed in Cr at 1% or more in terms of composition ratio expressed in atom quantity ratio.

5. A magnetic recording layer according to claim 1, wherein said magnetic layer is comprised of plural layers and a magnetic layer located at the lowest level of the plural magnetic layers is an intermediate layer having a thickness of 1 nm or more to 5 nm or less and coercive force of $2,000/(4\pi)(kA/m)$ or less.

6. A magnetic recording medium according to claim 1 further comprising a protective layer which is formed on said magnetic layer and composed of mainly C.

7. A magnetic recording apparatus comprising a magnetic recording medium for recording information with the direction of magnetization and a magnetic head disposed adjacent or in contact with said magnetic recording medium for indicating the magnitude of resistance depending on the direction of magnetization at each point on the magnetic recording medium so as to reproduce information by detecting the direction of magnetization at each point on the magnetic recording medium by detecting the magnitude of resistance of the magnetic head, wherein said magnetic recording medium comprises:

a base body composed of nonmagnetic metallic material;

a first foundation layer made of alloy material which is formed on said base body and composed of mainly Cr with added B;

a second foundation layer made of alloy material which is composed of one or more layers formed on said first foundation layer and in which one or more elements selected from a group consisting of Mo, Ta, Ti, W and V are mixed in Cr wherein said second foundation layer is comprised of plural layers and the total sum, in atomic %, of elements other than Cr is smaller in the layer nearer said first foundation layer; and a magnetic layer made of alloy material which is formed on said second foundation layer and composed of mainly Co.

* * * * *